United States Patent [19]

Yeo

[11] Patent Number: 5,280,507
[45] Date of Patent: Jan. 18, 1994

[54] METHOD AND APPARATUS FOR SENSING OBSTRUCTIONS IN A NUCLEAR FUEL ROD

[75] Inventor: Denis Yeo, Columbia, S.C.

[73] Assignee: Westinghouse Electric Corp., Pittsburgh, Pa.

[21] Appl. No.: 353,266

[22] Filed: May 17, 1989

[51] Int. Cl.⁵ .............................................. G21C 17/00
[52] U.S. Cl. ...................................... 376/251; 376/245; 376/246; 376/247; 376/256
[58] Field of Search ............... 376/245, 246, 259, 450, 376/247, 251, 256; 73/861.61, 861.49

[56] References Cited
U.S. PATENT DOCUMENTS

| | | | |
|---|---|---|---|
| 3,777,546 | 12/1973 | Rollins | 73/4 R |
| 4,039,375 | 8/1977 | Worlton et al. | 376/251 |
| 4,051,712 | 10/1977 | Zias et al. | 73/4 R |
| 4,204,422 | 5/1980 | Inoue et al. | 73/4 R |
| 4,430,886 | 2/1984 | Rood | 73/37 |
| 4,590,791 | 5/1986 | Reed et al. | 73/4 R |
| 4,698,997 | 10/1987 | Hess et al. | 73/4 R |

Primary Examiner—Brooks H. Hunt
Assistant Examiner—Meen Chelliah

[57] ABSTRACT

A method and apparatus of sensing obstructions in a tubular nuclear fuel rod or the like is disclosed. A nozzle is positioned to engage one end of the fuel rod in an air tight sealed relationship. A first gas flows through the nozzle and then into and through the fuel rod. The pressure is sensed and compared with a standardized pressure to determine any excess back pressure in the nozzle indicating an obstruction present therein.

7 Claims, 1 Drawing Sheet

METHOD AND APPARATUS FOR SENSING OBSTRUCTIONS IN A NUCLEAR FUEL ROD

This invention relates to a method and apparatus for sensing obstructions in a tubular nuclear fuel rod or the like.

BACKGROUND OF THE INVENTION

Nuclear fuel rods are manufactured from openended zirconium alloy tubular rods. Fissionable pellets are inserted into the rods which are end-plugged. The completed fuel rods are arranged in a skeletal structure containing as many as 264 fuel rods and other core component rods and control rods. This structure is placed into the reactor housing to form its core thereat.

In a nuclear reactor, the nuclear fuel contained within each fuel rod undergoes fission which increases the temperature and pressure within the rods. Any hydrogenous impurities present in the rods typically form hydrides causing the rod to leak radioactive products into the coolant. To minimize internal rod decay and hydriding during reactor operation, the interior of the rods are cleaned during their manufacture by blowing through the fuel rods felt or urethane cleaning plugs. However, during the cleaning process, a cleaning plug or portion thereof may become lodged within the rod. If visual inspection does not locate the cleaning plug before the rod is filled with fissionable pellets and then girth and seal welded, the cleaning plug is retained therein. During reactor operation, the cleaning plug will lead to hydriding causing rod leakage and subsequent contamination of the reactor coolant. Consequently, it is necessary to assure that no obstruction, such as a cleaning plug, is retained within the fuel rod before the fissionable pellets are inserted therein and the fuel rod is welded. Current visual inspection systems have been found inadequate because a cleaning plug or other obstruction can cause a partial obstruction which is difficult to detect.

It is therefore an object of this invention to provide a method and apparatus for sensing obstructions, such as a cleaning plug, in a tubular nuclear fuel rod or the like without using a visual inspection system.

It is still another object of this invention to provide a method and apparatus for sensing obstructions, such as a cleaning plug, in a tubular nuclear fuel rod or the like, which is adapted for repeatable use with many fuel rods.

It is another object of the present invention to provide a method and apparatus for sensing obstructions, such as a cleaning plug, in a tubular nuclear fuel rod or the like, where an audible alarm signal can be generated if an obstruction is present.

SUMMARY OF THE INVENTION

In accordance with the present invention, there are provided a method and apparatus for sensing obstructions in a tubular nuclear fuel rod or the like. A nozzle is positioned in sealed relationship with one end of the fuel rod. A first gas flows through the nozzle and then into and through the fuel rod. The pressure of the flowing first gas is sensed at a location in the nozzle. The sensed pressure is compared with the flowing first gas with a standardized pressure which is equal to the sensed pressure when there is no obstruction in the fuel rod, and such that a difference between the sensed pressure and the standardized pressure is indicative of an obstruction in the fuel rod.

In the preferred embodiment, a second gas flows through a balance circuit which includes an outlet having a variable restriction. The pressure of the flowing second gas within the balance circuit is sensed, and such that the sensed pressure of the flowing second gas defines a standardized pressure. The fuel rod and outlet pressure both vent to the atmosphere so as to render the method insensitive to changes in atmospheric pressure.

BRIEF DESCRIPTION OF THE DRAWINGS

Some of the objects and advantages of the present invention having been stated, others will be more fully understood from the detailed description which follows and by reference to the accompanying drawing in which.

DETAILED DESCRIPTION OF THE PREFERRED EMBODIMENT

Figure 1:
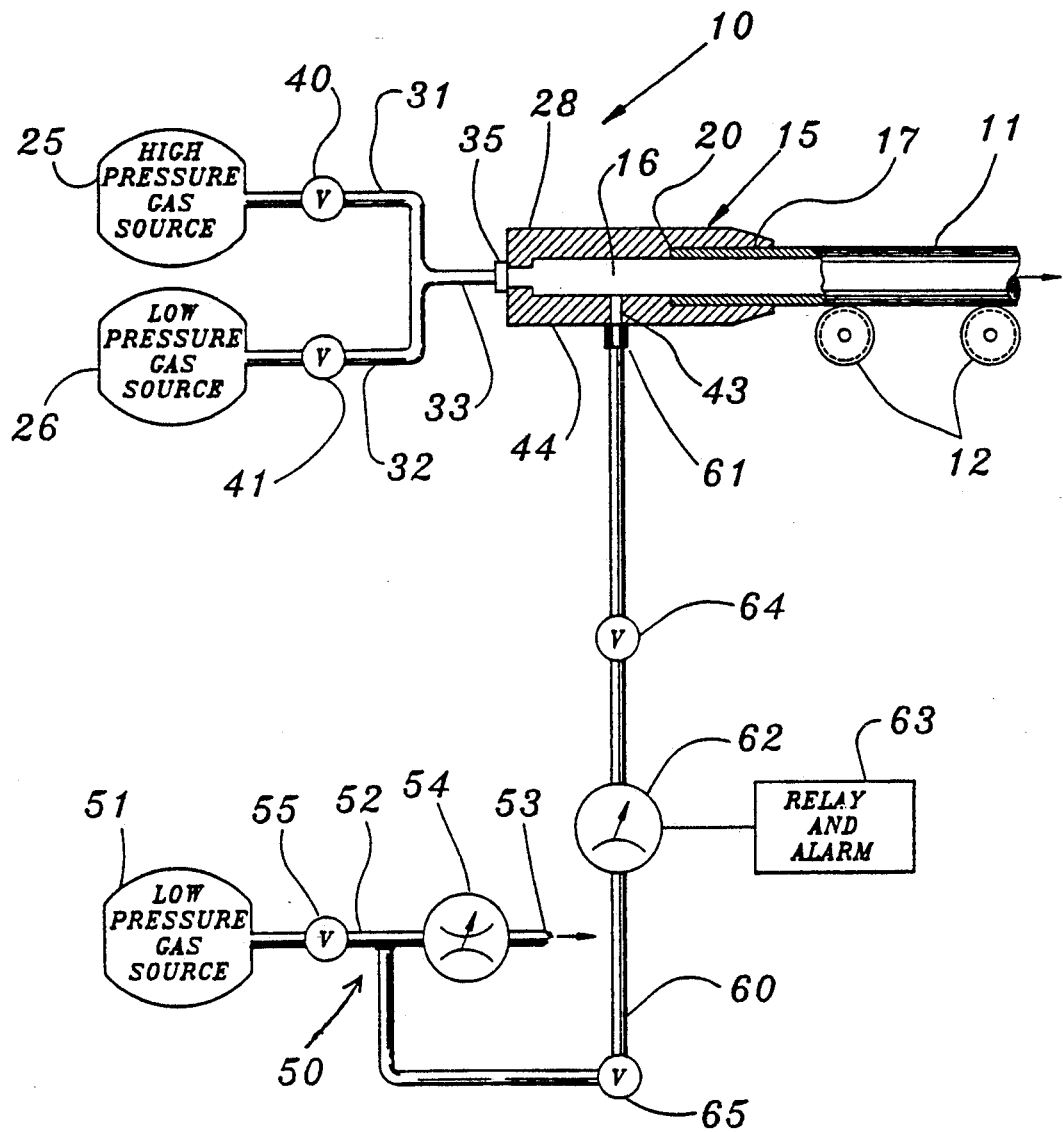
FIG. 1 is a schematic representation in partial sectional of the nozzle and balance circuit in accordance with the present invention.

Referring to the drawing, FIG. 1, there is shown the apparatus 10 in accordance with the present invention which is adapted to sense obstructions in a tubular nuclear fuel rod 11. As illustrated, the apparatus 10 includes conventional guide rollers and walking beam illustrated in schematic at 12 for guiding a nuclear fuel rod from a conventional rod storage area (not shown) and into engagement with a nozzle 15. The nozzle 15 is positioned adjacent the guide rollers and walking beam 12 and includes an axial opening 16 extending therethrough with an opening disposed at the front end 17 adapted to engage one end of the fuel rod in an air tight seal thereat. The nozzle 15 preferably is formed from stainless steel construction. Additionally, the nozzle 15 can be modified so that the fuel rod 11 engages a urethane or other soft gasket-like material (not shown) which is inserted within the nozzle to form a more efficient air tight seal thereat. To prevent the fuel rod 11 from extending completely through the nozzle 15, the nozzle axial opening 16 includes a stepped portion 20 therein adapted to engage the fuel rod 11 and act as a stop thereat.

As illustrated, respective high and low pressure gas sources 25, 26 connect the rear portion 28 of the nozzle 15 through conventional respective pressure lines 31, 32 which merge into a single pressure line 33 connecting the nozzle 15 through a coupling 15. Each pressure line 31, 32 includes respective solenoid gate valves 40, 41 therein for controlling the gas flow through the nozzle from either high or low pressure sources 25, 26. The solenoid gate valves 40, 41 can be controlled by any mechanical or other microprocessing means (not shown) conventional to the industry. Preferably, the gas is a nitrogen gas which is inexpensive and inert so as to minimize oxidation or hydrogenation in the interior of the fuel rod 11 through which the gas will flow.

As illustrated, the nozzle 15 includes an orifice 43 which extends radially through a medial portion of the nozzle 15 from the axial opening 16 to the outside surface 44 of the nozzle. The orifice 43 connects to a gas flow balance circuit illustrated generally at 50. The gas flow balance circuit 50 includes a low pressure nitrogen gas source 51 connecting a conventional pressure line 52 which is vented to the atmosphere at its outlet end 53. As will be explained in detail hereafter, because the fuel rod 11 and pressure line 52 are vented to the atmosphere, the apparatus is not affected by changes in atmospheric pressure. At the outlet, a variable restriction needle valve 54 is positioned which is adapted to increase or decrease the amount of low pressure nitrogen gas which can flow through the pressure line 52 and outlet 53. A solenoid gate valve 55 is positioned in the balance circuit pressure line 52 adjacent to the low pressure nitrogen gas source 51 to control the flow of low pressure nitrogen gas into the pressure line. The solenoid gate valve 55 and variable restriction needle valve 54 can be controlled by manual means or automatic microprocessing means (not shown).

A branch circuit 60 interconnects the balance circuit pressure line 52 with the nozzle 15. The branch circuit 60 interconnects to the pressure line 52 medially of the solenoid gate valve 55 and variable restriction needle valve 54 and connects to the nozzle 15 by conventional coupling means 61 at the orifice 43. The branch circuit 60 also includes a differential pressure gauge 62 positioned therein which is adapted to measure pressure in inches of water. A relay and alarm 63 interconnect the differential pressure gauge 62. The relay and alarm 63 are triggered by a pressure difference generally greater than one inch water pressure from a known established value as will be explained in detail hereafter. To protect the differential pressure gauge 62 from high pressure gas flowing through the nozzle 15 and fuel rod 11 engaged therewith, first and second branch circuit solenoid gate valves 64, 65 are positioned in the branch circuit 60 on either side of the differential pressure gauge 62. First and second branch circuit solenoid gate valves 64, 65 also can be controlled by manual means or other automatic microprocessing means (not shown).

In accordance with the present invention, the presence of an obstruction, such as a felt cleaning plug, in a nuclear fuel rod is determined by the apparatus 10. In operation, the apparatus 10 initially is calibrated with a known fuel rod not having obstructions therein. A known fuel rod is advanced by the guide rollers and walking beam 12 into engagement with the nozzle 15. The low pressure gas solenoid gate valve 41 is opened allowing low pressure nitrogen gas at approximately three pounds per square inch (21 kPa) to flow through the nozzle 15 and fuel rod 11. The solenoid gate valve 55 positioned in the balance circuit pressure line 52 is opened to allow the low pressure nitrogen gas to flow at approximately three pounds per square inch (21 kPa) through the variable restriction 54 at the outlet 53. The low pressure gas flowing through the nozzle and the known nuclear fuel rod forms a back pressure in the nozzle 15. This back pressure is sensed by the differential pressure gauge 62. The differential pressure gauge 62 is calibrated or "zeroed" by adjusting the variable restriction needle valve 54 so that the back pressure in the nozzle 15 is equal to the pressure flowing through the branch circuit 60. The amount of back pressure created in the branch circuit 60 is varied by adjusting the variable restriction needle valve 54 to balance the back pressure produced in the nozzle 15. This adjusted pressure becomes the standardized pressure for the apparatus 10. Once the system is calibrated by adjusting the variable restriction needle valve 54, the known fuel rod is removed from the nozzle.

After the apparatus 10 is calibrated, an unknown fuel rod 11 having potential obstructions therein is advanced into engagement with the nozzle 15. The branch circuit first and second solenoid valves 64, 65 are closed and the high pressure solenoid gate valve 25 opened. Thirty to fifty pounds per square inch (204 to 340 kPa) of nitrogen gas flow into the nozzle 15 and through the fuel rod 11. It has been found that the high pressure gas can blow some obstructions from the fuel rod 15. Afterward, the high pressure gas solenoid gate valve 40 is closed and the low pressure gas solenoid gate valve 41 is opened to allow the low pressure nitrogen gas to flow through the nozzle 15 and fuel rod 11. Branch circuit solenoid gate valves 64, 65 are opened and the balance circuit low pressure gas solenoid gate valve 55 is opened to allow the low pressure nitrogen gas to flow through the variable restriction needle valve 54, into the branch circuit 60 and to the nozzle 15.

If the unknown fuel rod 11 is the same length as the fuel rod used in calibrating the apparatus 10, and the fuel rod also is unobstructed, back pressure produced in the nozzle 15 by the low pressure nitrogen gas flowing through the fuel rod 11 will balance the gas flowing through the branch circuit 60 into the nozzle 15. In this balanced state, the differential pressure gauge 62 will measure the standardized pressure defined in calibration or "zero" Additionally, changes in atmospheric pressure will not affect the balanced condition because both the fuel rod 11 and outlet 53 are vented to the atmosphere. However, if an obstruction is present in the fuel rod 15, the obstruction will block the flow of gas therethrough and create a greater back pressure in the nozzle 15. The differential pressure gauge 62 measures the additional back pressure produced in the nozzle 15. To alarm an operator that an obstruction is present, the differential pressure gauge 15 triggers a relay and alarm 63 when the measured difference between the standardized pressure and the back pressure produced in the nozzle 15 exceeds a set value, typically greater than one inch water pressure (0.2486 kPa). Preferably the alarm is an audible signal which is generated to warn an operator that an obstruction is present. If an obstruction is present, the fuel rod is removed and the obstruction removed therefrom by means conventional to the industry.

To start the sequence again, a new unknown fuel rod is advanced to the nozzle 15. The sequence of valve openings and closings are performed as before. Because the variable restriction needle valve 54 previously has been adjusted to balance the circuit, the variable restriction does not need to be adjusted again. If the unknown fuel rod is of the predetermined established length and is not obstructed, the back pressure produced in the nozzle 15 will balance and equal the pressure flowing through the branch circuit 60, thus indicating an unobstructed fuel rod.

The foregoing embodiment is to be considered illustrative, rather than restrictive of the invention and modifications which come within the meaning and range of equivalent of the claims are to be included therein.

That which is claimed is:

1. The method of sensing obstructions in a tubular nuclear fuel rod or the like, and comprising the steps of
providing a nozzle having high and low gas pressure sourced connected thereto, and providing a gas flow balance circuit directly communicating with the nozzle, said gas flow balance circuit including an outlet having a variable restriction,
calibrating the balance circuit and including positioning the nozzle in sealed relationship with one end of a fuel rod known to be free of internal obstructions, flowing a low pressure gas from the low pressure gas source through the nozzle and into and through the fuel rod, sensing the pressure of the flowing gas at a location in the nozzle so as to define a standardized pressure, flowing a balance circuit gas through the balance circuit while sensing the pressure of the gas within the balance circuit, and adjusting the variable restriction of the balance circuit so that the sensed pressure within the balance circuit equals the standardized pressure, positioning the nozzle in sealed relationship with one end of a fuel rod to be tested, flowing a low pressure gas from the low pressure gas source through the nozzle and then into and through the fuel rod to be tested, flowing a balance circuit gas through the balance circuit to produce the standardized pressure, sensing the pressure of the flowing low pressure gas in the nozzle, and comparing the sensed pressure of the flowing low pressure gas with the standardized pressure of the balance circuit flowing gas and such that a difference between the sensed pressure of the low pressure gas flowing in the nozzle from the low pressure gas source and the standardized pressure of the balance circuit is indicative of an obstruction in the fuel rod being tested.

2. An apparatus for sensing obstructions in a tubular nuclear fuel rod or the like, and comprising a nozzle adapted to engage one end of a fuel rod in an air tight sealed relationship, means connected to said nozzle for flowing an initial high pressure gas flow through said nozzle and into a fuel rod positioned in an air tight sealed relationship with said nozzle so as to blow any obstructions from the interior of fuel rod, means connected to said nozzle for flowing a low pressure ga flow through said nozzle and into a fuel rod positioned in an air tight sealed relationship with the nozzle, means for sensing the pressure of the flowing low pressure gas in the nozzle when the low pressure gas is flowing through the nozzle, a gas flow balance circuit directly communicating with the nozzle, said gas flow balance circuit including an outlet having a variable restriction, means for flowing a balance circuit gas through the balance circuit, and means for sensing the balance circuit gas flow and such that the pressure of the balance circuit gas flow equals a standardized pressure, and means for comparing the sensed pressure of the flowing low pressure gas with the standardized pressure of the balance circuit gas flow, and such that a difference between the sensed pressure and the standardized pressure is indicative of an obstruction in the fuel rod.

3. The method as defined in claim 1 wherein the fuel rod and the outlet of the balance circuit both vent to the atmosphere, and so as to render the method insensitive to changes in atmospheric pressure.

4. The method as defined in claim 1 comprising the further step of generating a visible or audible alarm signal when the difference between the sensed pressure and the standardized pressure is greater than a predetermined value.

5. The method as defined in claim 1 comprising the further step of passing an initial high pressure gas from the high pressure gas source through the nozzle and into and through the fuel rod prior to the step of flowing the low pressure gas therethrough, and so as to blow any obstructions from the interior of the fuel rod.

6. The apparatus as defined in claim 2 wherein the fuel rod and the outlet of said balance circuit both vent to the atmosphere, and so as to render the apparatus insensitive to changes in atmospheric pressure.

7. The apparatus as defined in claim 2 wherein said comparing means includes means for generating a visible or audible alarm signal when the difference between the sensed pressure and the standardized pressure is greater than a predetermined value.

* * * * *